United States Patent
Pinkerton

(10) Patent No.: US 9,145,296 B2
(45) Date of Patent: Sep. 29, 2015

(54) MITIGATING DIBORANE RELEASE FROM BOROHYDRIDE-BASED HYDROGEN STORAGE MATERIALS

(75) Inventor: Frederick E. Pinkerton, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1134 days.

(21) Appl. No.: 13/038,520

(22) Filed: Mar. 2, 2011

(65) Prior Publication Data

US 2012/0225008 A1 Sep. 6, 2012

(51) Int. Cl.
*C01B 3/00* (2006.01)
*C01B 3/04* (2006.01)

(52) U.S. Cl.
CPC .............. *C01B 3/001* (2013.01); *C01B 3/0078* (2013.01); *C01B 3/04* (2013.01); *Y02E 60/324* (2013.01); *Y02E 60/364* (2013.01)

(58) Field of Classification Search
CPC ............ C01B 3/00; C01B 3/04; C01B 3/065; C01B 3/323; C01B 6/0005; C01B 6/508; C01B 6/00; C01B 6/02; C01B 6/04; C01B 6/06; C01B 6/15; C01B 6/21; C01B 6/24

USPC ............... 252/188.25; 423/648.1, 658.2, 286, 423/645; 502/200, 202, 400, 406
See application file for complete search history.

(56) References Cited

U.S. PATENT DOCUMENTS

2007/0264182 A1* 11/2007 Vajo et al. ...................... 423/286
2010/0233076 A1* 9/2010 Siegel et al. ............... 423/648.1

* cited by examiner

*Primary Examiner* — Paul Wartalowicz
(74) *Attorney, Agent, or Firm* — Reising Ethington P.C.

(57) ABSTRACT

A method is disclosed for storing and releasing hydrogen from a mass of transition metal borohydride particles, or a mass of mixed, transition metal and alkali metal-containing, borohydride particles where hydrogen is to be released by heating the mass of particles upon a demand for hydrogen in a hydrogen-using application. Particles of a metal hydride are mixed with the metal borohydride particles to form a mass of hydrogen storage particles. The composition and amount of the metal hydride mixed into the hydrogen storage particles serves to react with boron from the borohydride particles to form a metal boride and to suppress release of diborane as hydrogen is released from the heated metal borohydride particles.

13 Claims, 2 Drawing Sheets

MITIGATING DIBORANE RELEASE FROM BOROHYDRIDE-BASED HYDROGEN STORAGE MATERIALS

TECHNICAL FIELD

This specification pertains to the release of hydrogen from an alkali metal-transition metal borohydride (e.g., $Na_xZn_y(BH_4)_{x+2y}$) while minimizing the concomitant release of diborane ($B_2H_6$). More specifically, this disclosure pertains to careful mixing of a metal hydride compound with the alkali metal-transition metal borohydride and heating the mixture to release hydrogen and capture the boron as a solid boride compound.

BACKGROUND OF THE INVENTION

Metal borohydrides containing $BH_4^-$ complexes are attractive candidates for compact hydrogen storage because of their large hydrogen content relative to their weight and volume. Simple alkali metal or alkaline earth metal borohydrides such as $LiBH_4$ (18.5 wt % hydrogen), $NaBH_4$ (10.7 wt % hydrogen), $Mg(BH_4)_2$ (14.9 wt % hydrogen), and $Ca(BH_4)_2$ (11.6 wt % hydrogen) are too stable, requiring high temperatures (300-500° C.) to release hydrogen, and even partial re-absorption of hydrogen requires high $H_2$ pressures. Moreover, intermediate phases such as $Li_2B_{12}H_{12}$ can form during decomposition at high temperature, and once formed these phases strongly inhibit reversibility.

Transition metal borohydrides and mixed alkali metal-transition metal borohydrides are less stable, and therefore could be suitable candidates for hydrogen storage. Transition metal borohydrides include the borohydrides of chromium, cobalt, copper, iron, manganese, molybdenum, nickel, niobium, scandium, titanium, vanadium, yttrium, zinc, and zirconium. Mixed borohydride compounds of one of such transition metals and an alkali metal such as lithium, sodium, or potassium may also be formed. Unfortunately, in many cases the borohydride decomposes through the emission of diborane gas ($B_2H_6$) in addition to yielding hydrogen gas. Such emission is clearly deleterious; first, most of the available hydrogen is tied up as diborane rather than being released as $H_2$, second, diborane evolution permanently removes boron from the material, and third, diborane may present environmental issues.

There is a need for a method of recovering hydrogen from transition metal borohydrides and mixed alkali metal-containing and transition metal-containing borohydrides while reducing or eliminating the evolution of diborane gas.

SUMMARY OF THE INVENTION

One example of a mixed alkali metal-transition metal borohydride, that tends to release diborane gas with hydrogen, is the Na—Zn-borohydride system. This mixed borohydride can be formed from $ZnCl_2$ and $NaBH_4$ by an ion exchange reaction:

$$ZnCl_2 + dNaBH_4 \rightarrow aNaCl + bNa_2ZnCl_4 + cNa_xZn_y(BH_4)_{x+2y} \quad (1)$$

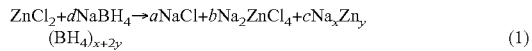

where a, b, c, d, x, and y are chosen to balance the reaction, e.g., (x+2y)=(d/c).

Two Na—Zn-borohydride compounds have been identified to date, namely $NaZn(BH_4)_3$ (x=1, y=1) and $NaZn_2(BH_4)_5$ (x=1, y=2). For the purpose of demonstrating this invention, samples were synthesized using d=2.

The ion exchange reaction may be conducted, for example, by mixing the solid alkali metal and transition metal precursors in a suitable ball mill. High energy ball milling with a SPEX 8000 Mixer/Mill is a typical method for producing the sodium zinc borohydride on the right from the starting mixture on the left in equation (1). Once formed, $Na_xZn_y(BH_4)_{x+2y}$ is slightly unstable at room temperature and will slowly decompose over a period of days. For this reason, in the following work, a fresh sample was milled for each experiment.

When heated, the ball milled mixture containing $Na_xZn_y(BH_4)_{x+2y}$ decomposes at low temperature (onset ~60° C.) according to the reaction:

$$aNaCl + bNa_2ZnCl_4 + cNa_xZn_y(BH_4)_{d/c} \rightarrow Zn + 2NaCl + (d-2)Na + (d/2)B_2H_6 + (d/2)H_2 \quad (2)$$

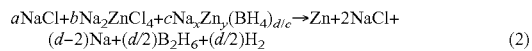

While the sodium chloride and sodium zinc chloride are diluents in the mixture, the sodium zinc borohydride produces both $H_2$ and $B_2H_6$ in approximately equal molar quantities. While hydrogen is released in good quantity, it is necessary, as described above, to minimize the release of diborane ($B_2H_6$). Hence, this sodium zinc borohydride-containing mixture was selected as a suitable test system for embodiments of this invention because of its known proclivity for generating substantial amounts of diborane.

This invention provides a means to reduce, and potentially completely eliminate, the diborane gas produced from transition metal borohydrides and mixed alkali metal-transition metal borohydrides. In practices of the invention another compound is used in combination with the borohydride to minimize release of diborane. Preferably the added compound is another hydride that forms a boride. In this way the boron in the borohydride can be captured by the product boride phase rather than forming diborane and escaping from the material.

For purposes of illustration, the examples given here use Na—Zn-borohydride, synthesized according to (1) with d=2, as a diborane-producing model system. And $MgH_2$ is added to the system to provide the boride-forming compound, with the formation of $MgB_2$ as the product phase. In this illustrative diborane-eliminating system, a hypothetical decomposition reaction might be:

$$aNaCl + bNa_2ZnCl_4 + cNa_xZn_y(BH_4)_{d/c} + (d/2)MgH_2 \rightarrow Zn + 2NaCl + (d-2)Na + (d/2)MgB_2 + (5d/2)H_2 \quad (3)$$

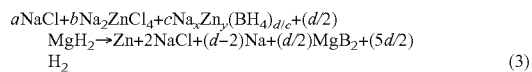

The $MgH_2$ also provides additional hydrogen to partially offset the added weight of the Mg. The theoretical hydrogen release from this reaction is 4.23 wt %, including the extra weight of the chlorides. The hydrogen release from the active portion of the sample, excluding the diluents, NaCl and $Na_2ZnCl_4$, is 8.30 wt %.

In practices of this embodiment of the invention, it is necessary to intimately mix the $MgH_2$ with the other components without having the $MgH_2$ react with the other components prior to formation of the mixed borohydride. Reaction during synthesis could be reduced by careful non-energetic hand mixing of $MgH_2$ with a previously milled mixture of $ZnCl_2$ and $NaBH_4$. The preferred method in this invention, however, is to directly combine $ZnCl_2$, $NaBH_4$, and $MgH_2$ by milling in a cooled vessel such that the material during milling is kept below the minimum temperature required to induce reaction between the borohydride and the $MgH_2$ (<50° C., see FIG. 3). For the example given here, the milling vessel is continuously cooled by flowing liquid nitrogen (called cryomilling).

Thus, mixed transition metal-alkali metal borohydrides may be utilized for hydrogen storage and release with minimal or no accompanying release of diborane gas. In accordance with embodiments of the invention, this result may be accomplished by mixing a suitable metal hydride with the mixed borohydride to capture the boron as a solid boride. In accordance with preferred embodiments of the invention, the metal hydride is of relatively low molecular weight (and relatively high hydrogen content) and it possesses suitable reactivity for capturing the boron in a solid compound from the mixed transition metal-alkali metal borohydride in a solid compound. In a preferred embodiment of the invention the transition metal borohydride or the materials forming the transition metal-alkali metal borohydride and the metal hydride are each selected so as to yield an abundance of hydrogen from a relatively small weight and volume of the mixed materials.

Accordingly, practices are illustrated and disclosed herein, permitting the use of suitable transition metal borohydrides and mixed transition metal-alkali metal borohydrides as a volume or mass of hydrogen-containing particles for the release of hydrogen on demand for use in a hydrogen-consuming or hydrogen-using device or application. The hydrogen-containing particles are stored at a suitable temperature and in a suitable container, the temperature and chemical environment being managed to minimize unwanted premature hydrogen release. Upon demand, or need, hydrogen is released from the borohydride containing particles by heating the mixture at a suitable rate to a suitable temperature for decomposition of the borohydride(s). The heating may be continued, or stopped and later continued, until hydrogen is depleted from a suitable mass or volume of the borohydride containing particles.

Alternatively, the hydrogen-containing particles may be maintained at a suitable fixed temperature under a suitable pressure of hydrogen gas. The fixed temperature and hydrogen pressure are selected for the specific combination of mixed transition metal-alkali metal borohydride and solid boride-forming, metal hydride. Hydrogen can be released on demand by reducing the hydrogen pressure, for example, by withdrawing some of the hydrogen gas to supply a desired hydrogen-using application, such that the particles partially decompose until hydrogen pressure is restored. In order to suppress unwanted release of diborane from the borohydride particles, the particles are intimately mixed with particles of a suitable metal hydride in an amount for capture of the boron content of the borohydride material as it is otherwise being decomposed to release hydrogen gas.

Borohydride compounds that release diborane during decomposition cannot be simply restored to their original state by exposure to hydrogen gas. Expensive and difficult chemical regeneration would be required to replace the boron constituent lost during decomposition. By including an additional boron-binding material to retain the boron, it is comprehended that combinations of alkali metals and transition metals in borohydride form having suitable thermodynamic stability will thereby be able to be reversed under hydrogenation conditions to reconstruct the original composition. It is noted, however, that the Na—Zn-borohydride system selected for this demonstration (because of its known diborane-producing decomposition) is itself unstable under ambient conditions of temperature and pressure, and will spontaneously decompose within a few days. As such, this particular combination of alkali metal and transition metal is not expected to show reversibility even in the presence of a diborane mitigator.

Other objects and advantages of the invention will be apparent from the further illustrations which follow.

DESCRIPTION OF PREFERRED EMBODIMENTS

Examples

To establish the behavior of a mixed borohydride system, a mixture of $ZnCl_2+2\ NaBH_4$ (reflecting molar proportions) was ball milled for 30 min in a SPEX 8000 Mixer/Mill. The resulting mixture was than analyzed and tested as follows.

An X-ray diffraction (XRD) pattern of the resulting milled powder showed the milled sample to be a combination of NaCl, $Na_2ZnCl_4$, and $NaZn_2(BH_4)_5$.

Figure 1:
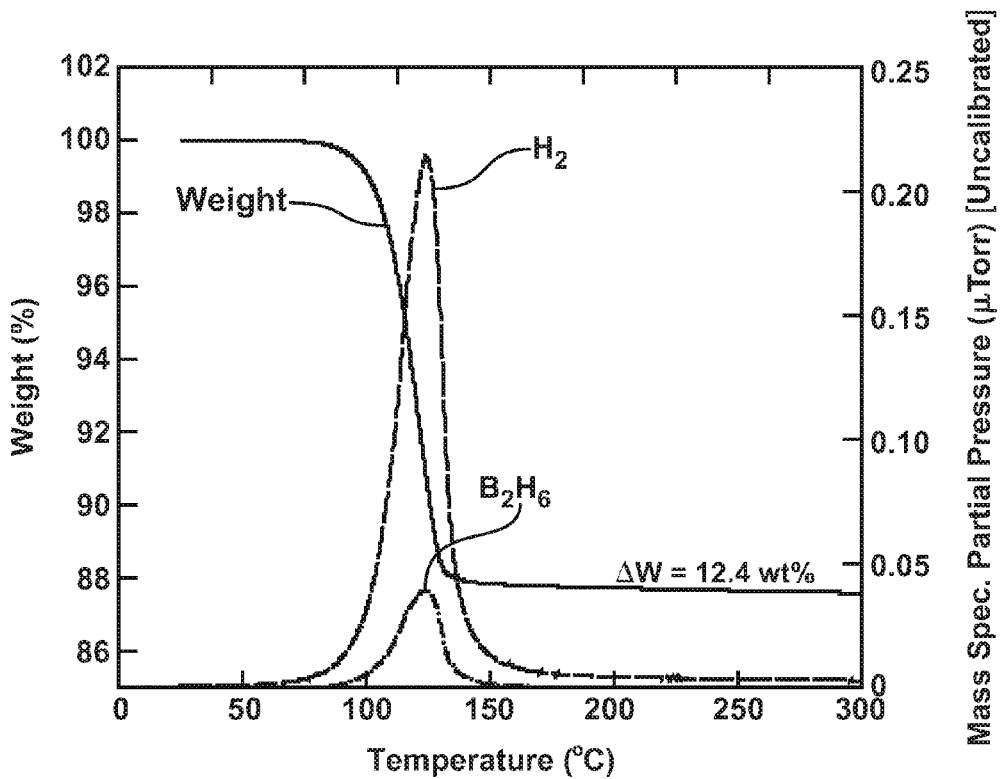
FIG. 1 is a graph of percentage of weight loss (solid line) (left-side, y-axis), during heating of a ball milled sample of $ZnCl_2+2\ NaBH_4$, versus temperature in ° C. (x-axis) over a heating range of the sample from room temperature to 300° C. The proportions of hydrogen (dash line) and (diborane dot-dash line) are reflected in the right-side, y-axis, which presents un-calibrated Mass Spectrometer partial pressures in μTorr.

Thermal decomposition of a portion of the ball milled mixture was obtained and measured gravimetrically in a Hiden Intelligent Gravimetric Analyzer (IGA) while heating the sample from room temperature to 300° C. at 4.2° C./s in flowing He gas, with a mass spectrometer (MS) sampling the exhaust gas. As shown in FIG. 1, weight loss and gas evolution were detectable starting at about 60° C., and were complete at about 140° C. The total observed weight loss of 12.4 wt % is consistent with the expected reaction producing both hydrogen and diborane in accordance with the assumed reaction (2) as presented above:

This assumed reaction predicts a weight loss of 14.0 wt %, of which 13.05 wt % is diborane and 0.95 wt % is $H_2$. The $H_2$ (2 atomic mass units, amu) and $B_2H_6$ (26 amu) MS signatures are also shown. In this example, the mass spectrometer was not calibrated, so quantitative results could not be reliably extracted from these data; however the relative $B_2H_6/H_2$ ratio can be reasonably compared from sample to sample. In this case, the $B_2H_6/H_2$ ratio is calculated from the areas under the emission peaks to be 0.69 (compared to 1.00 predicted by the diborane producing reaction. The ratio takes into account that the MS cracking fraction for $H_2$ in mass channel 2 amu is 0.952, while the cracking fraction of $B_2H_6$ in mass channel 26 amu is 0.216. The difference from 1.00 most likely reflects the fact that the MS is not calibrated. After decomposition, XRD shows that the sample consists of Zn and NaCl, as predicted by equation 2.

Accordingly, it is illustrated that heating of a transition metal-alkali metal borohydride, as represented by $Na_xZn_y(BH_4)_{x+2y}$, yields both hydrogen and diborane. In accordance with embodiments of the invention, magnesium hydride, as a representative, relatively low molecular weight, metal hydride is added to the borohydride to suppress formation of diborane.

Incorporating $MgH_2$ into the borohydride sample by simply ball milling a mixture of $ZnCl_2+2\ NaBH_4+2\ MgH_2$ in the same manner as the additive-free sample was unsuccessful because the sample decomposed during the ball milling itself. Note that a two-fold excess of $MgH_2$ additive is present compared to reaction (3); this was done to ensure that more than sufficient $MgH_2$ was available for reaction.

Figure 2:
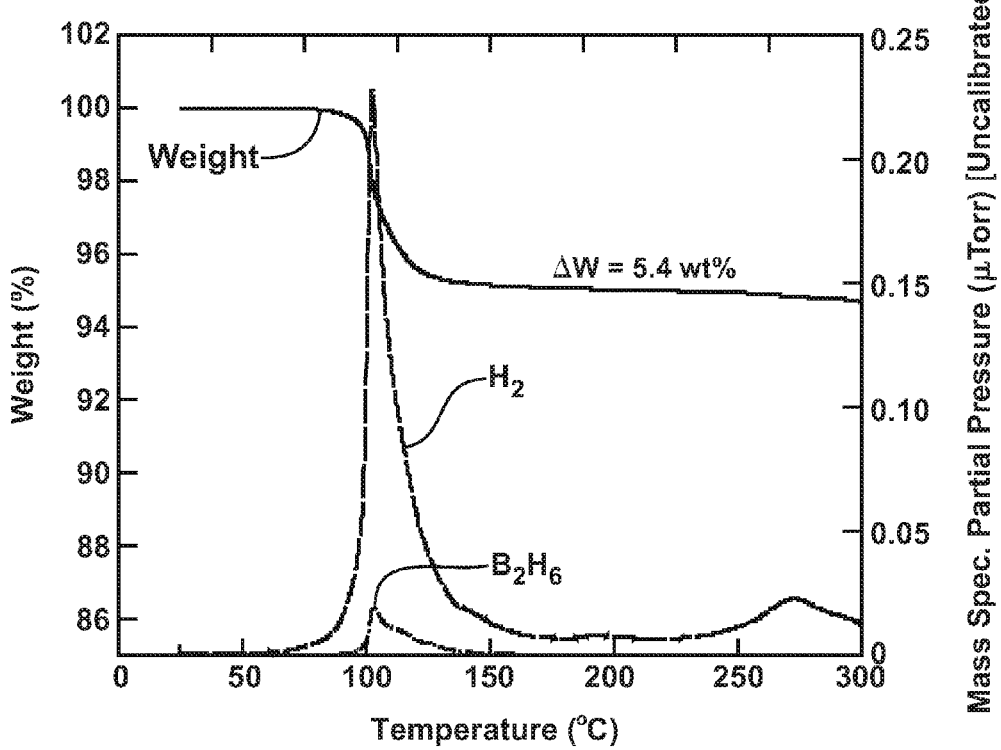
FIG. 2 is a graph of percentage of weight loss (solid line) (left-side, y-axis) versus temperature in ° C. (x-axis) during heating of a ball milled and hand ground sample of NaCl, $Na_2ZnCl_4$, $Na_xZn_y(BH_4)_{x+2y}$, and 2 $MgH_2$. The first three components were obtained by ball milling $ZnCl_2$ and 2 $NaBH_4$. Then the magnesium hydride was lightly ground and mixed with the chlorides and borohydride in a mortar and pestle. The percentage total weight loss data was obtained as the sample was heated over a heating range from room temperature to 300° C. The proportions of hydrogen (dash line) and diborane (dot-dash line) produced are reflected in the right-side, y-axis which presents un-calibrated Mass Spectrometer partial pressures in μTorr.

To prevent premature reaction during milling, a precursor sample composed of $ZnCl_2+2\ NaBH_4$ was first prepared by ball milling at ambient temperature in the same manner as described above in this specification. This ball milling yielded a first powder consisting of NaCl, $Na_2ZnCl_4$, and $Na_xZn_y(BH_4)_{x+2y}$, as confirmed by XRD. Particles of $MgH_2$ were then added to the ball milled precursor powder, again with a two-fold molar excess, by lightly grinding the two powders together by hand in a mortar and pestle. The grinding was performed in a glove box to protect the sample from atmospheric exposure. The resulting weight loss behavior, upon heating in the IGA thermo-gravimetric analysis furnace, is shown in FIG. 2. The total weight loss in the decomposition event is 5.44 wt %, and the $B_2H_6/H_2$ ratio is 0.24, or about 35% of the ratio in the unmodified $ZnCl_2+NaBH_4$. Diborane release has thus been reduced by 65% compared to the $MgH_2$-free sample. However, it was unclear whether partial reaction occurred during grinding. XRD of the mixed material was not obtained.

It was then determined that ball milling of this illustrative precursor hydrogen storage mixture in a cryogenically-cooled (for example, with liquid nitrogen) ball mill was a more suitable way for preparing reactive precursor compounds. In many embodiments of the invention, such cryomilling is a preferred method of synthesis.

Accordingly, a sample of $ZnCl_2+2\ NaBH_4+2\ MgH_2$ was directly synthesized by milling the starting powders in a Retsch cryomill, the housing of which was cooled with flowing liquid nitrogen during milling. Powders of the starting constituents ($ZnCl_2$, $NaBH_4$, and $MgH_2$) were loaded into the stainless steel milling jar along with eight 12 mm diameter stainless steel milling balls. The milling apparatus and milling jar were pre-cooled for 2 minutes to allow the jar to reach low temperature before milling began. The powders were milled at a frequency of 25 Hz for a total of 30 min in six 5-min stages separated by 1 min resting intervals at 5 Hz, while liquid nitrogen was circulating around the grinding jar. The cryogenic temperature, near that of liquid nitrogen, prevented premature reaction of the $MgH_2$, but still allowed the formation of the target Na—Zn-borohydride compound. An x-ray diffraction pattern of a sample of the cryomilled material confirmed the presence of the desired borohydride and metal hydride precursor materials, and did not reflect the presence of by-products of premature hydrogen release or of diborane release. Specifically, the XRD confirmed unreacted $MgH_2$.

Figure 3:
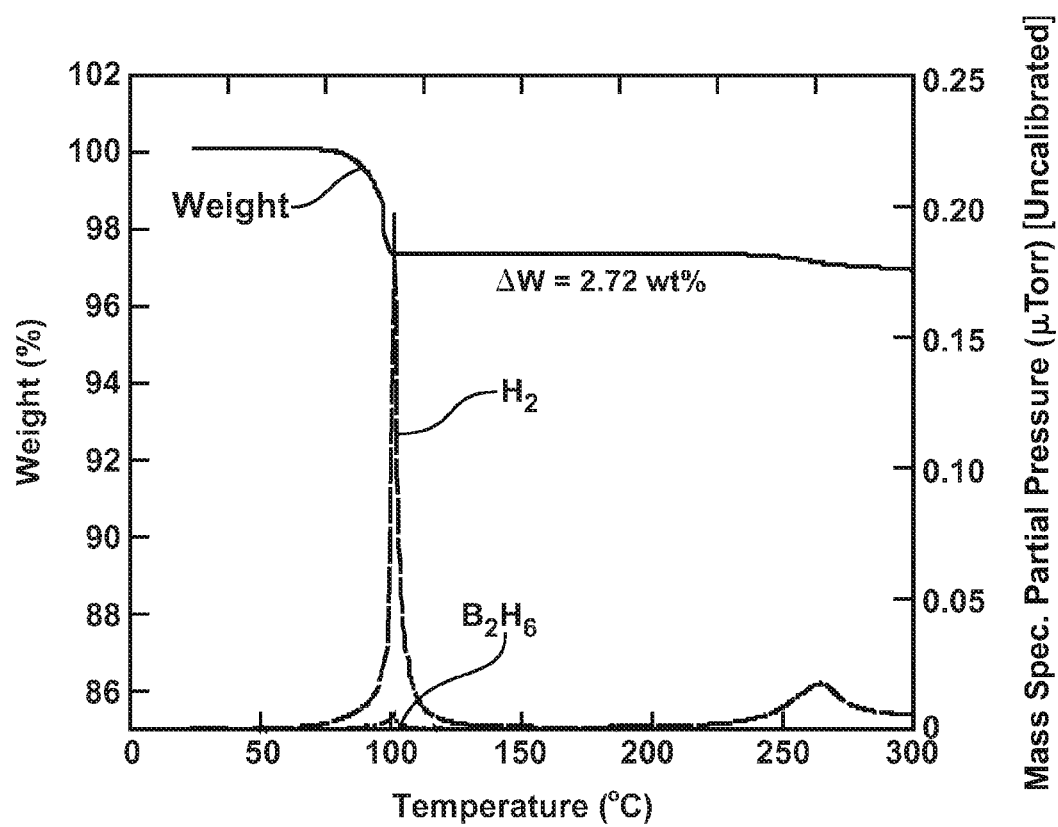
FIG. 3 is a graph of percentage of weight loss (solid line) (left-side, y-axis) versus temperature in ° C. (x-axis) during heating of a cryomilled mixture of $ZnCl_2+2\ NaBH_4+2\ MgH_2$. The percentage total weight loss data was obtained as the sample was heated over a heating range from room temperature to 300° C. The proportions of hydrogen (dash line) and diborane (dot-dash line) produced are reflected in the right-side, y-axis which presents un-calibrated Mass Spectrometer partial pressure in μTorr.

Weight loss from the cryomilled sample was measured using a Hiden Intelligent Gravimetric Analyzer (IGA) while heating the sample from room temperature to 300° C. at 4.2° C./s in flowing He gas, with a mass spectrometer (MS) sampling the exhaust gas. Weight loss of the cryomilled precursors during heating is shown in FIG. 3.

This sample had the smallest overall weight loss, 2.72 wt %, in the first decomposition, which is even below the predicted loss. The $B_2H_6/H_2$ ratio is 0.15, representing 22% of the value for unmodified $ZnCl_2+2\ NaBH_4$. The 78% reduction in diborane release is the lowest value obtained to date from Na—Zn-borohydride. The additional 0.55 wt % hydrogen release at higher temperature is attributable to the excess $MgH_2$ in the sample. XRD of the decomposed product (not shown) confirms the presence of the expected $MgB_2$ reaction product. It also showed evidence for new product phases such as MgZn2 as well as several as yet unidentified peaks, suggesting that the reaction path is more complex than reaction (3).

In accordance with the presented examples, particles of a transition metal chloride ($ZnCl_2$) and an alkali metal borohydride ($NaBH_4$) were reacted by ball milling to form a transition metal-alkali metal borohydride ($Na_xZn_y(BH_4)_{x+2y}$). In this practice, sodium chloride and a sodium zinc chloride are formed as by-products which are diluents in the hydrogen-producing mixture. Obviously, other suitable chlorides, halides, or other compounds of other transition metal may be used as precursors. And other alkali metal compounds may be used as precursors. And the transition metal-alkali metal borohydrides may be separated, when economically justified, from the diluting transition metal-alkali metal by-products. Alternatively, the mixed borohydrides could be formed by alternate synthesis pathways that do not co-produce diluent species such as NaCl.

As stated above, a particulate mass of transition metal borohydrides may also be used (without an alkali metal constituent) in the practice of the invention.

Magnesium dihydride is a suitable and preferred particulate additive to the borohydride particle hydrogen storage mass for diborane mitigation because of the relatively low molecular weight of the hydride. However, other relatively low molecular weight, relatively high hydrogen-content, solid boride compound forming, metal hydrides may be used.

Accordingly, practices are illustrated and disclosed herein, permitting the use of suitable transition metal borohydrides and mixed transition metal-alkali metal borohydrides as a volume or mass of hydrogen-containing particles for the release of hydrogen on demand for use in a hydrogen consuming or hydrogen using device or application. The hydrogen-containing particles are stored at a suitably low temperature and in a suitable container, the temperature and environment being managed to minimize unwanted hydrogen release. Upon demand, or need, hydrogen is released from the borohydride containing particles by heating the mixture at a suitable rate to a suitable temperature. The heating may be continued, or stopped and later continued, until hydrogen is depleted from a suitable mass or volume of the borohydride containing particles. Alternatively, as stated above in this specification, the hydrogen-containing particles may be maintained at a suitable fixed temperature under a suitable pressure of hydrogen gas. Hydrogen can be released on demand by reducing the hydrogen pressure, for example, by withdrawing some of the hydrogen gas to supply a desired hydrogen-using application, such that the particles partially decompose until hydrogen pressure is restored.

In order to suppress unwanted release of diborane from the borohydride particles, they are mixed with a suitable metal hydride in an amount for capture of the boron content of the borohydride material.

Practices of the invention have been described using illustrations of specific embodiments of the invention. But these illustrations are not limiting of the scope of the invention.

The invention claimed is:

1. A method for storing and releasing hydrogen from a mass of particles of a mixed transition metal and alkali metal borohydride compound, where hydrogen is to be released from the mass of boron-containing particles upon a demand for hydrogen in a hydrogen-using application, the mixed transition metal-alkali metal borohydride compound tending to release diborane as it releases hydrogen; the method comprising:

mixing particles of a metal hydride with the mass of mixed transition metal-alkali metal borohydride compound particles to form a mass of mixed hydrogen storage particles;

storing the mass of mixed hydrogen storage particles at a temperature and in a chemical environment to minimize release of hydrogen until there is a demand for the hydrogen in the mixed hydrogen storage particles; and, upon such demand heating the mass of mixed hydrogen storage particles to a temperature above the storage temperature to release hydrogen for delivery to the hydrogen-using application while hydrogen is demanded; the composition and amount of the metal hydride mixed into the mass of hydrogen storage particles serving to react with boron from the mixed transition metal-alkali metal borohydride compound particles to form a solid metal boride and to suppress release of diborane as hydrogen is released from the heated mixed hydrogen storage particles.

2. A method as recited in claim 1 in which the mixed transition metal-alkali metal borohydride compound particles comprise a transition metal selected from the group consisting of chromium, cobalt, copper, iron, manganese, molybdenum, nickel, niobium, scandium, titanium, vanadium, yttrium, zinc, and zirconium.

3. A method as recited in claim 1 in which the mixed transition metal-alkali metal borohydride compound particles comprise an alkali metal selected from the group consisting of lithium, sodium, and potassium.

4. A method as recited in claim 1 in which the metal hydride comprises magnesium hydride.

5. A method as recited in claim 1 in which the mass of hydrogen storage particles is stored under hydrogen gas pressure, and upon a demand for hydrogen, the mass of hydrogen storage particles is heated to a hydrogen pressure as hydrogen is produced by the heated hydrogen storage mass and delivered to the hydrogen-using application.

6. A method for storing and releasing hydrogen from a mass of particles of a zinc-containing and sodium-containing borohydride compound, where hydrogen is to be released from the mass of boron-containing particles upon a demand for hydrogen in a hydrogen-using application; the method comprising:

mixing particles of a metal hydride with the mass of metal borohydride compound particles to form a mass of mixed hydrogen storage particles;

storing the mass of mixed hydrogen storage particles at a temperature and in a chemical environment to minimize release of hydrogen until there is a demand for the hydrogen in the particles; and, upon such demand heating the mass of particles to a temperature above the storage temperature to release hydrogen for delivery to the hydrogen-using application while hydrogen is demanded; the amount of the metal hydride mixed into the hydrogen storage particles serving to react with boron from the borohydride compound particles to form a solid metal boride and to suppress release of diborane as hydrogen is released from the heated metal borohydride compound particles.

7. A method as recited in claim 6 in which the mixing of particles of a metal hydride with the metal borohydride compound particles is accomplished by ball milling to form a mixture of particles comprising a borohydride compound and a metal hydride, the ball milling apparatus being cooled to minimize release of hydrogen during the ball milling.

8. A method as recited in claim 6 in which the mass of hydrogen storage particles is stored under hydrogen gas pressure, and upon a demand for hydrogen, the mass of hydrogen storage particles is heated to a temperature to maintain a hydrogen pressure as hydrogen is produced by the heated hydrogen storage mass and delivered to the hydrogen-using application.

9. A method as recited in claim 6 in which the metal hydride comprises magnesium hydride.

10. A method for storing and releasing hydrogen from a mass of particles of a zinc-containing and sodium-containing borohydride compound, where hydrogen is to be released from the mass of boron-containing particles upon a demand for hydrogen in a hydrogen-using application, the zinc-containing and sodium-containing borohydride compound tending to release diborane as it releases hydrogen; the method comprising:

mixing particles of magnesium hydride with the mass of the borohydride compound particles to form a mass of mixed hydrogen storage particles;

storing the mass of mixed hydrogen storage particles at a temperature and in a chemical environment to minimize release of hydrogen until there is a demand for the hydrogen in the particles; and, upon such demand heating the mass of particles to a temperature above the storage temperature to release hydrogen for delivery to the hydrogen-using application while hydrogen is demanded; the composition and amount of the metal hydride mixed into the mass of hydrogen storage particles serving to react with boron from the borohydride particles to form a solid metal boride and to suppress release of diborane as hydrogen is released from the heated metal borohydride compound particles.

11. A method as recited in claim 10 in which the mixing of particles of a metal hydride with the metal borohydride compound particles is accomplished by ball milling of a mixture of $ZnCl_2$, $NaBH_4$ and $MgH_2$ to form a mixture of particles comprising a sodium-containing and zinc-containing borohydride compound and magnesium hydride, the ball milling apparatus being cooled to minimize release of hydrogen during the ball milling.

12. A method as recited in claim 10 in which the mixing of particles of a metal hydride with the metal borohydride compound particles is accomplished by ball milling of a mixture comprising $ZnCl_2$, $NaBH_4$ and $MgH_2$ to form a mixture of particles comprising a sodium-zinc borohydride compound and $MgH_2$, the ball milling apparatus being cooled with liquid nitrogen to minimize release of hydrogen during the ball milling.

13. A method as recited in claim 10 in which the mass of hydrogen storage particles is stored under hydrogen gas pressure, and upon a demand for hydrogen, the mass of hydrogen storage particles is heated to a hydrogen pressure as hydrogen is produced by the heated hydrogen storage mass and delivered to the hydrogen-using application.

* * * * *